United States Patent
Yeo et al.

(10) Patent No.: US 9,491,370 B2
(45) Date of Patent: Nov. 8, 2016

(54) METHODS AND APPARATUSES FOR PROVIDING GUIDE INFORMATION FOR A CAMERA

(71) Applicant: Samsung Electronics Co., Ltd., Gyeonggi-do (KR)

(72) Inventors: Jaeyung Yeo, Gyeonggi-do (KR); Soyoung Kim, Gyeonggi-do (KR); Youngjoon Kim, Gyeonggi-do (KR); Bokun Choi, Seoul (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 226 days.

(21) Appl. No.: 14/242,093

(22) Filed: Apr. 1, 2014

(65) Prior Publication Data
US 2014/0300779 A1 Oct. 9, 2014

(30) Foreign Application Priority Data
Apr. 9, 2013 (KR) .................. 10-2013-0038706

(51) Int. Cl.
*H04N 5/232* (2006.01)
*H04N 5/235* (2006.01)
*G09G 3/34* (2006.01)

(52) U.S. Cl.
CPC ........ *H04N 5/2351* (2013.01); *H04N 5/23222* (2013.01); *G09G 3/3406* (2013.01); *H04N 5/23293* (2013.01)

(58) Field of Classification Search
CPC ........... H04N 5/2351; H04N 5/23293; G09G 3/3406
USPC .................................................. 348/234, 370
See application file for complete search history.

(56) References Cited

U.S. PATENT DOCUMENTS

| | | | |
|---|---|---|---|
| 6,806,906 B1* | 10/2004 | Soga | H04N 5/232 348/333.03 |
| 2009/0115868 A1* | 5/2009 | Kim | H04N 5/232 348/222.1 |
| 2010/0074613 A1 | 3/2010 | Masuno et al. | |
| 2012/0320262 A1* | 12/2012 | Chung | H05B 37/0272 348/370 |

FOREIGN PATENT DOCUMENTS

JP    2009-212802 A    9/2009

* cited by examiner

*Primary Examiner* — Ahmed A Berhan
(74) *Attorney, Agent, or Firm* — Cha & Reiter, LLC.

(57) ABSTRACT

The present invention relates to methods and apparatuses for providing guide information for a camera. An image is collected through the camera. The image includes a subject illuminated by a light source. An optimized direction is determined for the light source relative to the subject. Guide information is generated that specifies an adjustment of the light source relative to the subject for achieving the optimized direction for the light source. The generated guide information is outputted to provide a visual, audible, or tactile indication.

22 Claims, 13 Drawing Sheets

FIG. 2

11 — GUIDE PROVIDING MODE — ON | OFF
12 — SET DIRECTION OF LIGHT SOURCE

| PURITY LIGHT | ☐ |
| PLAIN LIGHT | ✓ |
| SIDE LIGHT | ☐ |
| CROSS LIGHT | ☐ |
| BACK LIGHT | ☐ |

13 — AUTOMATIC CONTROL FOR PHOTOGRAPHING MODE — ON | OFF

10

METHODS AND APPARATUSES FOR PROVIDING GUIDE INFORMATION FOR A CAMERA

CLAIM OF PRIORITY

This application claims priority under 35 U.S.C. §119(a) to Korean Patent Application Serial No. 10-2013-0038706 filed in the Korean Intellectual Property Office on Apr. 9, 2013, the entire disclosure of which is incorporated by reference herein.

BACKGROUND

1. Technical Field

The present disclosure relates to methods and apparatuses for providing guide information for a camera and, more particularly, to methods and apparatuses for providing guide information for adjusting a direction of a light source that illuminates a subject to achieve an optimum orientation of the light source relative to the subject.

2. Description of the Related Art

At present, conventional cameras provide a function for adjusting the brightness of an image to obtain a desired result. There are two methods for adjusting the brightness of an image provided by the camera. The first method uses an internal strobe or a detachable strobe as an auxiliary light source. The strobe provides a predetermined amount of light at the moment of photographing by synchronizing with a camera control system. The second method selects a desired or correct lighting condition by controlling a shutter speed, an aperture setting, auto white balance (AWB), and a numerical exposure index adopted by the International Standardization Organization (ISO) that may be used to indicate the light sensitivity of the camera.

However, a strobe provides a limited amount of light, and therefore cannot be used to obtain an adequate photo under conditions of low ambient light. Moreover, a strobe provides a different level of image quality compared to a photo taken with a natural light source. The foregoing method of controlling a photographing mode of the camera permits adjustments only within the range of ambient light provided by a given photographing environment, and thereby the usability of this method is limited.

Basically, controlling the brightness of an image or controlling an exposure in photographing is preferable to processing the image after the image has been gathered.

SUMMARY

In accordance with an aspect of the present disclosure, a method provides guide information for a camera that specifies an adjustment of a location of a subject relative to a light source that is illuminating the subject.

In accordance with another aspect of the present disclosure, a method provides guide information for a camera. The method comprises collecting an image through the camera, wherein the image includes a subject illuminated by a light source; determining an optimized direction for the light source relative to the subject; generating guide information that specifies an adjustment of the light source relative to the subject for achieving the optimized direction for the light source; and outputting the generated guide information.

In accordance with another aspect of the present disclosure, a method provides guide information for a camera by extracting an area of a subject from an image and determining a location of a light source by using a photometric method, to permit adjustment of the subject relative to the camera.

In accordance with another aspect of the present disclosure, a method provides guide information for a camera in an electronic device that includes a camera unit, the method comprising: collecting a preview image using the camera unit, generating guide information that specifies an adjustment of a direction of a light source for a subject in the preview image according to a predetermined direction of the light source, and outputting the generated guide information.

The generating of guide information includes: measuring a direction of the light source for the subject in the image, and calculating movement information for at least one of the subject or the electronic device based on a difference between the predetermined direction of the light source and a measured direction of the light source.

The measuring of the direction of the light source includes: identifying a location of the subject in the image, identifying a location of the light source by performing light measuring within the image; and identifying the direction of the light source based on the location of the subject in the image and the location of the light source.

The identifying of the location of the subject includes: detecting a user's input for the image, wherein the image includes a plurality of subjects, and identifying a location of a specific subject from the plurality of subjects in response to the user's input.

The identifying of the location of the subject includes extracting a face area of the subject by using a face detecting algorithm.

The identifying of the location of the light source includes: dividing the image into a plurality of areas, measuring an exposure value for each of the plurality of areas, and identifying a location of the light source based on a comparison of the measured exposure value for each of the plurality of areas.

The identifying of the location of the light source includes: dividing the image into a plurality of areas, measuring an exposure value for each of the plurality of areas divided from the image, dividing a face area of the image into a plurality of sub-areas of the face area, measuring an exposure value for each of the plurality of sub-areas divided from the face area, and identifying a location of the light source based on the exposure value for each of the plurality of areas of the image and the exposure value for each of the plurality of sub-areas of the face area.

The generating guide information comprises: identifying an angle difference between an actual direction of the light source and a predetermined direction of the light source, identifying a distance between the camera unit and the subject, calculating a curved movement distance based on the angle difference and the distance between the camera unit and the subject according to the following Formula 1, and generating the guide information by using at least one of the angle difference or the curved movement distance.

$$l = r \times \theta \quad \text{Formula 1}$$

where l is a curved movement distance, r is a distance between a camera unit and a subject, and Θ is an angle difference in radians.

The outputting guide information includes displaying both a preview image of the image and the guide information.

The outputting guide information comprises outputting at least one of a voice, a vibration, a solid light, a flashing light, or a visual graphical indication corresponding to the guide information.

The direction of the light source may be any of front light, plain light, side light, cross light, diffuse light, or back light.

In accordance with another aspect of the present disclosure, an electronic device includes a camera unit for collecting an image of at least one subject, a control unit for generating guide information to adjust a direction of a light source relative to a subject in the image collected through the camera unit according to a predetermined direction of the light source, and a display unit for displaying the guide information generated by the control unit.

The control unit measures a direction of the light source that is illuminating the subject in the image, calculates movement information for at least one of the subject or the electronic device based on the difference between the predetermined direction of the light source and the measured direction of the light source, and generates the guide information based on the movement information.

The control unit identifies a location of the subject in the image, identifies a location of the light source by performing light intensity measuring within each of a plurality of portions of the image, and identifies a direction of the light source based on the location of the subject and the location of the light source.

The electronic device further includes an input unit for receiving a user's input, wherein the control unit identifies a location of a specific subject from a plurality of subjects in response to detecting the user's input at the input unit.

The control unit extracts a face area of the subject by using a face detecting algorithm.

The control unit divides the image into a plurality of areas, measures an exposure value for each of the plurality of areas, and identifies a location of the light source based on the measured exposure value for each of the plurality of areas.

The control unit divides the image into a plurality of areas, measures an exposure value for each of the plurality of areas divided from the image, divides a face area of the image into a plurality of sub-areas of the face area, measures an exposure value for each of the plurality of sub-areas divided from the face area, and identifies a location of the light source based on the exposure value for each of the plurality of areas of the image and the exposure value for each of the plurality of sub-areas of the face area.

The display unit displays both a preview image of the image and the guide information under the control of the control unit.

The direction of the light source may be any of front light, plain light, side light, cross light, diffuse light, and back light.

The method of providing guide information for a camera optimizes an image, not by using artificial auxiliary lighting or a pre-specified photographing environment, but rather by providing guide information so that the locations of one or more of a light source, a subject, and a user using the electronic device may be actively changed. Therefore, an optimized photographic image can be obtained by using this method.

Further, the method of providing guide information for a camera enables an unskilled user of photometric technology to easily take an optimized photo, and also provides a user with a learning tool that shows the user how to arrange a light source and a subject to obtain an optimized photographic image.

BRIEF DESCRIPTION OF THE DRAWINGS

The features and advantages of the present invention will be more apparent from the following detailed description in conjunction with the accompanying drawings, in which:

FIG. 2 is a drawing showing an illustrative setting screen that provides guide information to a camera according to an exemplary embodiment of the present invention;

DETAILED DESCRIPTION

The present invention may be applied to provide guide information for an electronic device having a camera.

Further, the present invention may be applied not only to an electronic device having a camera such as a digital camera, smart camera, smart phone, portable terminal, mobile terminal, PDA (Personal Digital Assistant), PMP (Portable Multimedia Player), notepad, Wibro terminal, tablet PC, Notebook, and computer, but also to any equipment that is installable with, or capable of interfacing with, a camera.

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

In the description of the present invention, a singular form may encompass plural forms as well. Further, the terms "comprise" and "include" should not be understood to include all the components or all the steps listed in the description. Hereinafter, exemplary embodiments of the present invention are described in more detail with reference to the accompanying drawings.

Figure 1:
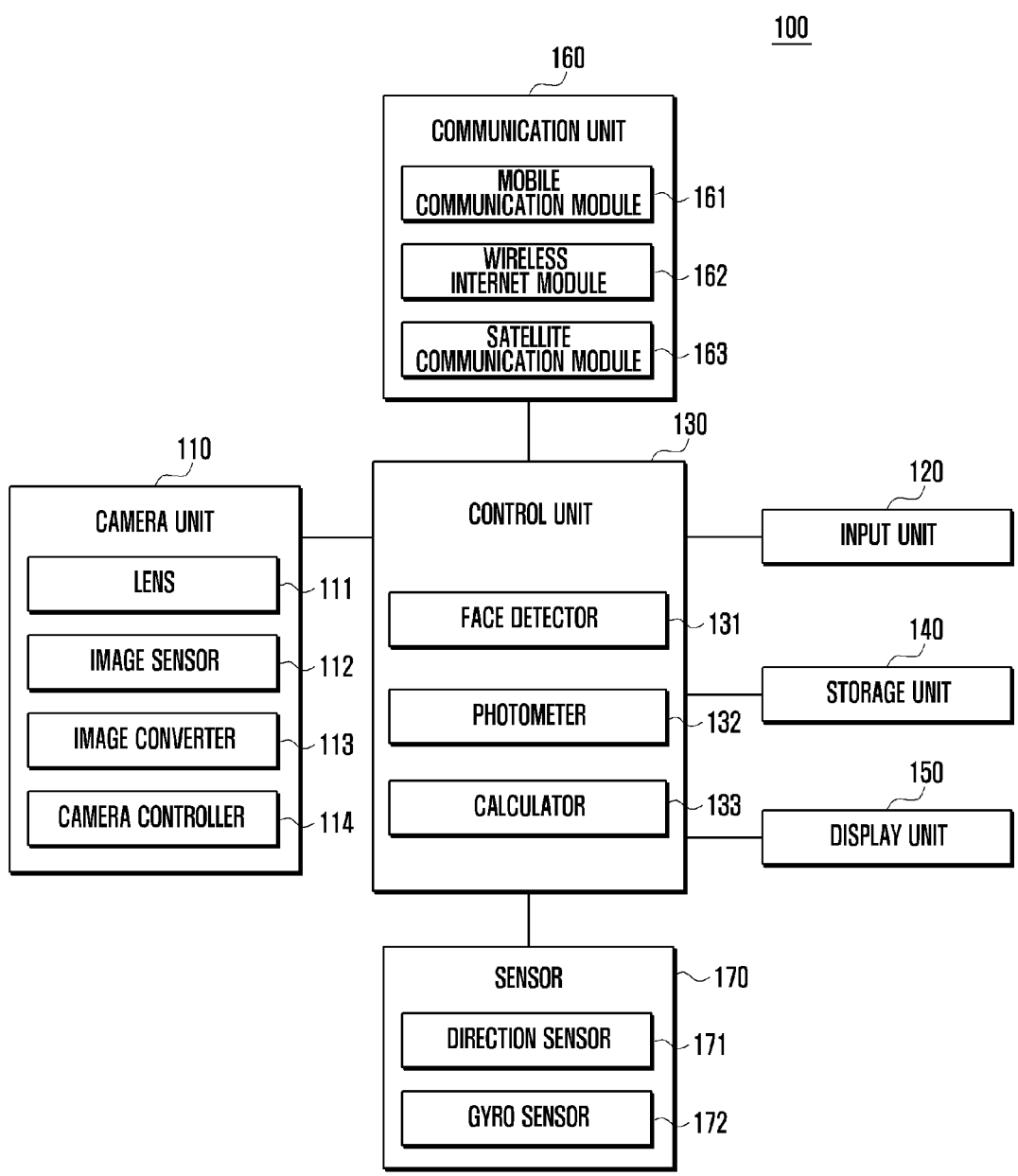
FIG. 1 is a block diagram showing an illustrative configuration of an electronic device constructed in accordance with an exemplary embodiment of the present invention.

FIG. 1 is a block diagram showing an illustrative configuration of an electronic device 100 constructed according to an exemplary embodiment of the present invention.

The electronic device 100 includes a camera unit 110, an input unit 120, a control unit 130, a storage unit 140, a display unit 150, a communication unit 160, and a sensor 170.

The camera unit 110 collects an image of at least one subject. The camera unit 110 includes a lens 111, an image sensor 112 for converting a light signal projected to the lens 111 to an electric signal, an image converter 113 for processing the signal output by the image sensor 112 and for converting the signal to a digital signal in a suitable format to be processed by the control unit 130, and a camera controller 114 for controlling the general operation of the camera unit 110.

The lens 111 is configured with at least one lens, and collects an image by collecting or gathering light and transmitting the collected or gathered light to the image sensor 112 under the control of the camera controller 114. The image sensor 112 may be configured with a CMOS image sensor device or a CCD image sensor device, and converts the image to an electronic signal by outputting an electric current or voltage that is proportional to, or a function of, the brightness of the collected image. The image sensor 112 generates a signal for each pixel of the image, and may sequentially output the signals by synchronizing with a clock. The image converter 113 may convert the signal output by the image sensor 112 to digital data. The image converter 113 may compress the converted digital data to a JPEG format, or include a codec for compressing the digital data to an MPEG format. The digital data converted by the image converter 113 may be transmitted to the control unit 130 under the control of the camera controller 114, and may be used for the operation of the electronic device 100.

For example, the control unit 130 may control the display unit 150 to display an image collected by the camera unit 110 as a preview image so that a user can identify the image projected through the camera. Further, according to a request for photographing accepted from the user, the control unit 130 may generate a photo image by using the image collected by the camera unit 110 at the time of photographing. The generated photo image may be stored in the storage unit 140 temporarily or permanently.

The camera unit 110 may be configured with more than one camera. For example, the camera unit 110 may be configured with a first camera (or front camera) for a self-photographing mode and a second camera (or rear camera) for photographing a subject located in front of the user. The camera unit 110 may generate signals for the collected image and signals including information for identifying whether the image is collected from the first camera or the second camera, and transmit these signals to the control unit 130.

The input unit 120 detects a user's input, and transmits an input signal corresponding to the user's input to the control unit 130. The input unit 120 may include any of a keypad, a dome switch, a touchpad (resistive or capacitive), a jog wheel, a jog switch, a finger mouse, or a wheel.

The input unit 120 may be configured with any of a touch sensor, a proximity sensor, an electromagnetic sensor, and a pressure sensor. The input unit 120 may detect a user's touch input or may detect a proximity input through the sensor. The input unit 120 may be configured with an input pad equipped with a sensor, illustratively provided in a film form or in a panel form. For example, the input unit 120 may be configured with an electromagnetic sensor for performing EMR (Electro Magnetic Resonance) sensing, or an input pad for performing EMI (Electro Magnetic Interference) sensing.

The input unit 120 may be provided with an input screen by configuring a layered structure that performs the functions of a display unit 150. For example, the input unit 120 may include an input pad having a touch sensor and a TSP (Touch Screen Panel) combined with the display unit 150. The input unit 120 having a layered structure equipped with the display unit 150 is called a touch screen.

According to an exemplary embodiment of the present invention, the input unit 120 may receive a user's input for selecting a guide providing mode that provides guide information to the user. The input unit 120 may also receive a user's input for specifying one or more detailed items related to the guide providing mode. If more than one subject is included in an image collected by the camera unit 110, the input unit 120 may receive a user's input for selecting a specific subject for which guide information is to be provided.

According to an exemplary embodiment of the present invention, the input unit 120 detects a user's input for setting a photographing mode of the camera unit 110, or a user's input requesting that the camera take a photograph, or both.

The control unit 130 controls the general operation of the electronic device 100. For example, the control unit 130 identifies a location of a light source that is illuminating a subject by analyzing the image collected by the camera unit 110.

In order to perform the foregoing functions, the control unit 130 may include a face detector 131, a photometer 132, and a calculator 133.

The face detector 131 detects a face of a human subject from the image collected by the camera unit 110 by using any of various face detecting algorithms. For example, the face detector 131 may detect the face area by using a knowledge-based algorithm for detecting a face according to a principle based on studying knowledge of features that are indicative of a face appearing in an image, or a bottom-up feature-based algorithm for detecting a face by using general characteristics that may appear in an image that includes a face, or a template matching algorithm for detecting an area having a higher similarity to standard pattern information in an image by using standard pattern information for a face image as calculated by a specific function, or an appearance-based algorithm for detecting a face area by using a statically analyzed result of the characteristics of face images. The step of detecting a face may be performed together with an automatic face recognition function of the camera unit 110.

The algorithm for detecting a face may be performed by using a program code that is stored in a non-transitory computer readable medium such as the storage unit 140. For example, the algorithm for detecting a face may be performed by using program code that includes an open source library (for example, OpenCV) for processing computer vision management. The face detector 131 detects a face from a collected image by executing a program stored in the storage unit 140.

The photometer 132 measures the brightness of a specific area, namely the extent of an exposure, in one or more portions of an image collected by the camera unit 110. The photometer 132 may measure the brightness of the specific area according to a matrix method, a partial method, or a spot metering method.

The photometer 132 may divide an image into a plurality of areas, and measure an exposure value for each area of the plurality of areas. The number, size, and shape of the divided areas may be decided according to the design of the camera unit 110. The photometer 132 labels the exposure values of each area according to the result of the brightness measuring.

The control unit 130 identifies a location of a light source in the image based on the exposure value measured by the photometer 132.

The calculator 133 calculates the direction of the light source relative to a subject based on the face area of the subject and the location of light source identified by the face detector 131 and the photometer 132. The calculator 133 further calculates movement information for at least one of the subject and the light source based on a predetermined direction of the light source representing an optimized or preferred direction, and a calculated direction of the light source representing the actual current measured direction of the light source.

According to an exemplary embodiment of the present invention, the control unit 130 generates guide information for adjusting the direction of light source relative to the subject in the image collected by the camera unit 110 to correspond with the predetermined direction of light source. The control unit 130 controls the electronic device 100 to output the generated guide information.

In more detail, the control unit 130 measures the direction of the light source relative to the subject in the image, and generates movement information for at least one of the subject or the electronic device 100. The movement information specifies a suggested or recommended movement of the light source, the electronic device 100, or the subject that is required to achieve a desired direction or orientation of the light source relative to the subject. The desired direction or orientation is achieved when the measured actual current direction of the light source is identical to the predetermined direction of the light source. The control unit 130 generates the guide information based on the movement information, and controls the display unit 150 to output the guide information.

According to an exemplary embodiment of the present invention, the control unit 130 extracts a face area in an image through the face detector 131, and identifies a location of a light source through the photometer 132. The control unit 130 further identifies a direction of a light source to the extracted location of the face area through the calculator 133, and calculates movement information for at least one of the face as a subject or the light source according to the predetermined location of the light source. The control unit 130 generates guide information based on the calculated movement information, and controls the electronic device 100 to output the guide information.

Hereinafter, the operation of the control unit 130 is described in more detail referring to the accompanying drawings.

The storage unit 140 stores a program or a command for the electronic device 100. The control unit 130 may execute the programs or commands stored in the storage unit 140.

The storage unit 140 may include at least one type of non-transitory storage media such as a flash memory, a hard disk, a micro-type multimedia card, a card memory (for example, SD or XD memory), a RAM (Random Access Memory), a SRAM (Static Random Access Memory), a ROM (Read-Only Memory), an EEPROM (Electrically Erasable Programmable Read-Only Memory), a PROM (Programmable Read-Only Memory), a magnetic memory, a magnetic disk, and an optical disk.

According to an exemplary embodiment of the present invention, the storage unit 140 may store an image collected by the camera unit 110 temporarily or permanently. The storage unit 140 further stores temporarily or permanently a photo or moving image generated according to a request for taking a photograph that is accepted from a user. The storage unit 140 may store information related to the image such as the date and the time that the photograph was taken, the geographic location where the photograph was taken, status information indicative of one or more photographing modes or settings of the camera, and pixel information for the photograph, together with the actual photographic image.

The display unit 150 outputs information processed by the electronic device 100. For example, the display unit 150 displays an application currently being executed and information corresponding to a program or a service. The display unit 150 may be equipped with one or more of a UI (User Interface) or a GUI (Graphical User Interface).

The display unit 150 may operate as a touch screen by configuring the input unit 120 and the sensor 130 in a layered structure. Here, the display unit 150 operating as a touch screen may perform the functions of the input unit 120.

According to an exemplary embodiment of the present invention, the display unit 150 displays a preview image of a collected image under the control of the control unit 130. The display unit 150 displays a user interface for a camera control together with the preview image. For example, the display unit 150 displays user interfaces for setting a photographing mode such as a shutter speed, an aperture opening, a white balance, an ISO, and a filter application, together with the preview image. Alternatively or additionally, the display unit 150 displays user interfaces for accepting a request for taking a photograph, switching between still photo mode and moving picture mode, and zooming in and out, together with displaying the preview image. The user interface may be configured with at least one of an icon, an image, and text.

Further, according to an exemplary embodiment of the present invention, the display unit 150 displays guide information under the control of the control unit 150. The guide information may comprise information for adjusting a direction of light source relative to a subject in an image so as to be identical to a predetermined direction of the light source. The guide information may be provided using at least one of an icon, an image, or text. Here, the display unit 150 may display the guide information together with the preview image.

The communication unit 160 performs transmission and reception of wireless signals with an external device. The communication unit 160 may include at least one module or circuit enabling wireless communication between the electronic device 100 and a wireless communication system, or between the electronic device 100 and a mobile communication system at which the electronic device is located. For example, the communication unit 160 may include any of a mobile communication module 161, a wireless internet module 162, and a satellite communication module 163.

The mobile communication module 161 may transmit a wireless signal to a base station or a server. The wireless signal may include a voice call signal, a video-telephony call signal, or various data including characters and multimedia message transmissions. The mobile communication module 161 may transmit a wireless signal to a base station by using a 3G or a 4G communication network, and may also use a communication network of the next generation beyond 4G according to the development of technology.

The wireless internet module 162 is a module for connecting to a wireless internet communications link, and may be installed in the electronic device or externally. The wireless internet module 162 may exchange a wireless signal by using a communication technology such as a WLAN (Wireless LAN), Wi-Fi, Wibro (Wireless broadband), Wimax (World Interoperability for Microwave Access), and HSDPA (High Speed Downlink Packet Access).

The satellite communication module 163 transmits data by using a wireless signal received from a satellite. In an exemplary embodiment of the present invention, the satellite communication module 163 may include a GPS receiver for receiving a wireless signal from a GPS satellite. The GPS receiver identifies a location of the electronic device 100 by using a microcomputer and a wireless signal received from the satellite.

According to an exemplary embodiment of the present invention, the communication unit 160 may receive information related to a location or position of the sun and an altitude of the sun above the earth from a server when an image is collected by the camera unit 110. The control unit 130 identifies the location of the light source in the image collected by the camera unit 110, based on the location information of the sun received through the communication unit 160.

The sensor 170 identifies the current or present state of the electronic device 100 by collecting information related to any change in magnetic field, gravity, pressure, temperature, or humidity. The sensor 170 may include a direction sensor 171 and a gyro sensor 172.

The direction sensor 171 identifies a bearing or directional orientation of the electronic device 100 by detecting a terrestrial magnetism surrounding the electronic device 100. The direction sensor 171 may be configured with a terrestrial sensor or a sensor operating similar to the terrestrial sensor.

The gyro sensor 172 is a sensor for measuring a rotation angle of the electronic device 100, and may detect the rotation angle based on 3-dimensional axes. For example, the gyro sensor 172 may detect rotation angles to x, y, and z axes based on the electronic device 100 as a center point. Namely, the gyro sensor 172 may detect pitching, rolling, and yawing of the electronic device 100.

According to an exemplary embodiment of the present invention, the control unit 130 identifies a direction at which the camera unit 110 is aiming, based on the information collected through the sensor 170. The control unit 130 identifies the direction of subject to the electronic device 100 according to the direction in which the camera unit 110 is aiming.

The electronic device 100 may further include a sound generator for outputting a sound and a haptic generator for outputting a vibration.

All of the components illustrated in FIG. 1 may not be essential for implementing certain of the exemplary embodiments described previously. For example, some of the components shown in FIG. 1 may omitted from the electronic device 100. Moreover, additional components not shown in FIG. 1 may be added to the electronic device 100.

FIG. 2 is a drawing showing an illustrative setting screen 10 that provides guide information to a camera according to an exemplary embodiment of the present invention. The setting screen 10 may include items such as a guide providing mode setting 11, a light source direction setting 12, and an automatic control setting for photographing mode 13.

The guide providing mode setting 11 is provided to set whether the guide providing function according to various exemplary embodiments of the present invention is to be performed or not. The guide providing mode setting 11 receives an input for setting the guide providing mode to "on" or "off" according to a selection received from a user. If the guide providing mode is set to "on" through the guide providing mode setting 11, the control unit 130 (FIG. 1) generates and outputs guide information for an image collected by the camera unit 110. If the guide providing mode is set to "off", the control unit 130 outputs only a preview image of an image collected by the camera unit 110 according to a general image processing method. According to an exemplary embodiment, the guide providing mode may be set to "on" or "off" through a quick menu, a shortcut key, or a shortcut button.

The light source direction setting 12 (FIG. 2) is provided to set a direction of a light source relative to a subject in advance. In more detail, the light source direction setting 12 receives an input for setting whether or not to provide guide information in which a direction of the light source relative to the subject is projected in the image collected by the camera unit 110 (FIG. 1).

Figure 3:
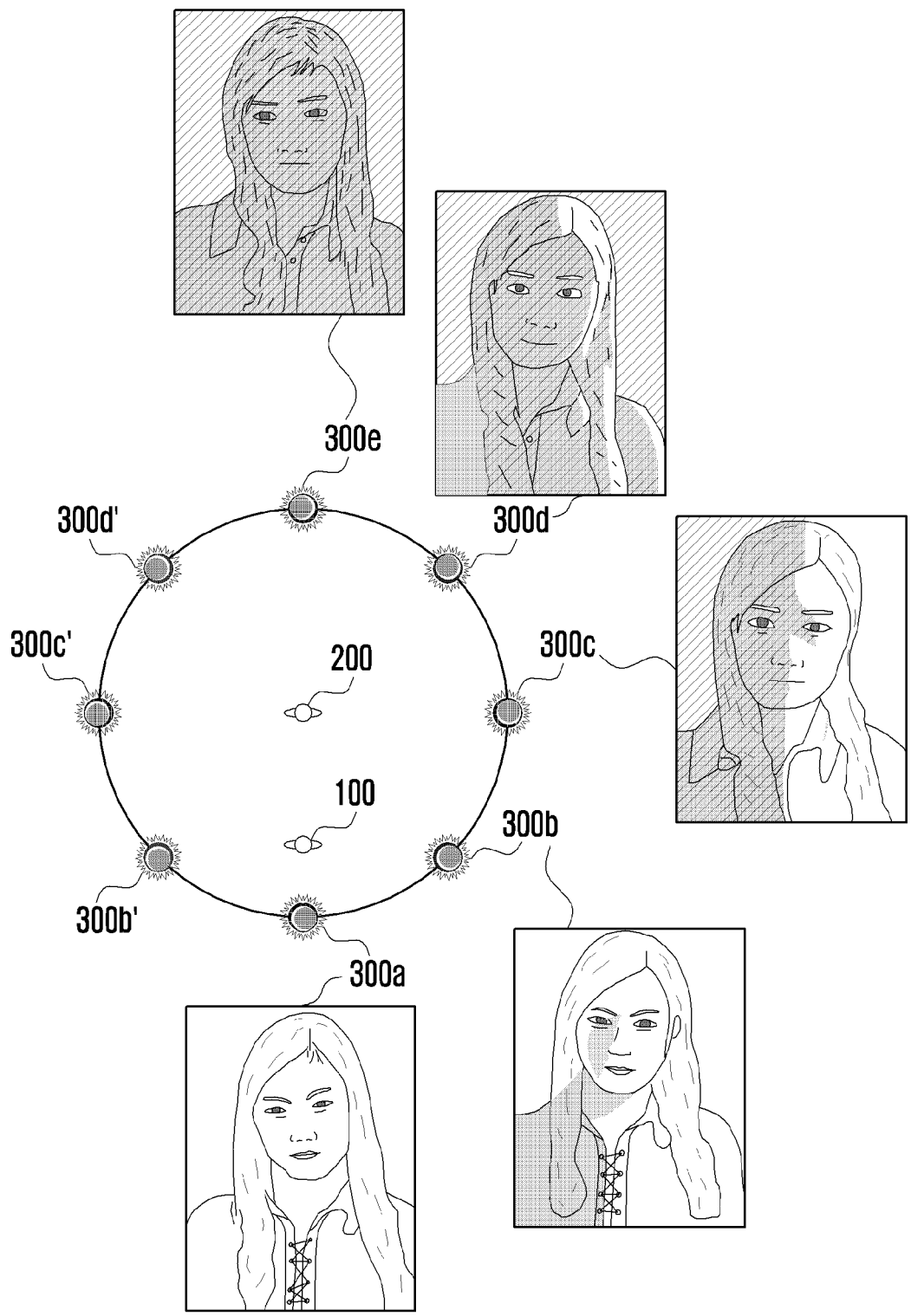
FIG. 3 is a drawing that illustrates determination of a direction of a light source.

Referring to FIG. 3, the direction of the light source may include at least one of a front light 300*a*, a plain light (300*b* or 300*b'*), a side light (300*c* or 300*c'*), a cross light (Rembrandt light; 300*d* or 300*d'*), or back light 300*e* based on the center of a subject to be photographed by the electronic device 100 (FIGS. 1 and 3).

With reference to FIG. 3, the front light 300*a* refers to a light source that is located substantially directly in front of a subject 200, namely, in the same direction as the electronic device 100. Using the front light 300*a* to photograph the subject 200, a bright image is produced without a shadow of the subject 200, and thus the image is clean and detailed. However, in the case of photographing a portrait of a person, use of the front light 300*a* may be problematic because some people will frown or squint their eyes in the presence of a bright light source.

The plain light (300*b* or 300*b'*) refers to a light source that is located substantially at an approximate 45° direction to the right or left of the front side of the subject 200. When illuminated by the plain light (300*b* or 300*b'*), the subject 200 is generally photographed as a bright image with portions of the image being cast in a pale shadow, and thereby emphasizing the three-dimensional characteristics of the subject 200.

The side light (300*c* or 300*c'*) refers to a light source that is located substantially to the right or left to the subject 200, namely, in a 90° direction to the right or left of the front side of the subject 200. Using the side light (300*c* or 300*c'*) to photograph the subject 200, a strong shadow may appear at one side of the subject 200, and thus a photographed image exhibits strong contrast between areas of light and areas of darkness.

The cross light (300*d* or 300*d'*) refers to a light source that is located substantially at a 135° direction with reference to the front side of the subject 200, or, in other words, at a 45° direction to the right or left of the rear side of the subject 200. Using the cross light (300*d* or 300*d'*) to photograph the subject 200, the subject appears as a dark image due to being under-exposed. However, the cross light (300*d* or 300*d'*) results in a somewhat dark and uniform illumination with small bright areas of highlights, but no unnecessary shadows, and thus a photographed image may provide a detailed, strong, and mysterious feeling.

The back light 300e refers to a light source that is located substantially at a 180° direction with respect to the front side of the subject 200, namely, at the rear side of the subject 200. Using the back light 300e to photograph the subject 200, a generally dark photo results due to underexposure. However, in some cases, strong outlines of the subject 200 are formed, and thus the photo provides a silhouette of the subject.

The possible directions or orientations of a light source to the subject 200 described previously are summarized in the following Table 1.

TABLE 1

| Light source | Direction to subject | Characteristics of photo |
|---|---|---|
| Front light | Front side (0°, same direction as electronic device) | Bright, detailed, and clean |
| Plain light | Right/Left 45° from front side | 3-dimensional effect and striking appearance |
| Side light | Right/Left 90° from front side | Strong image |
| Cross light | Right/Left 135° from front side (Right/Left 45° from rear side) | Mysterious image |
| Back light | 180° from the front side (rear side) | Silhouette is emphasized |

Several examples have been described above for illustrating various possible directions or orientations of the light source; however, the present invention is not limited to these enumerated examples and various directions or orientations of the light source in addition to those discussed previously may be considered with reference to the front side of a subject and according to an angle, distance, and height of the light source.

The light source direction setting 12 (FIG. 2) receives an input to set the direction of the light source desired by a user in advance. Illustratively, the direction of the light source may be selected from the directions of light source discussed previously and summarized in Table 1. If the user does not set the direction of the light source, the direction of light source may be set or selected automatically as a default value. Hereinafter, a case of setting the direction of the light source to the plain light 300b is described, referring to FIG. 2.

The automatic control setting for photographing mode 13 receives a user's input for setting whether or not a guide information providing mode and a photographing mode are automatically provided. For example, the photographing mode may include one or more settings such as a shutter speed, an aperture opening, a white balance setting, an ISO setting, and a filter application setting. The automatic control setting for photographing mode 13 receives an input for setting an automatic control for the photographing mode to "on" or "off". If the automatic control for photographing mode is set to "on", the control unit 130 (FIG. 1) automatically sets at least one of the previously described photographing mode settings to an appropriate value according to the result of analyzing a collected image while photographing. The automatic control setting for photographing mode 13 (FIG. 2) may include a user interface for setting each photographing mode setting to a specific value in advance.

Several components of the setting screen 10 have been described as examples in FIG. 2, however the setting screen 10 according to an exemplary embodiment of the present invention is not limited to the examples described previously, and various setting screens may be configured according to any of various types of functions settable by a user, any of various methods of providing a user interface, and any of various methods of receiving a user's input for selecting photographing mode settings which are provided by the electronic device 100 (FIG. 1).

For example, the setting screen 10 (FIG. 2) may include a detailed image corresponding to the direction of light source as shown in FIG. 3. Alternatively or additionally, the setting screen 10 (FIG. 2) may include tutorial information to help the user select appropriate photographing mode settings. The setting screen 10 may further include a user interface for setting or selecting a method by which the guide information will be outputted or displayed, such as an image display, a sound output, or a vibration output.

Hereinafter, a detailed method of providing camera guide information is described based on the guide providing mode as set or selected as previously described.

Figure 4:
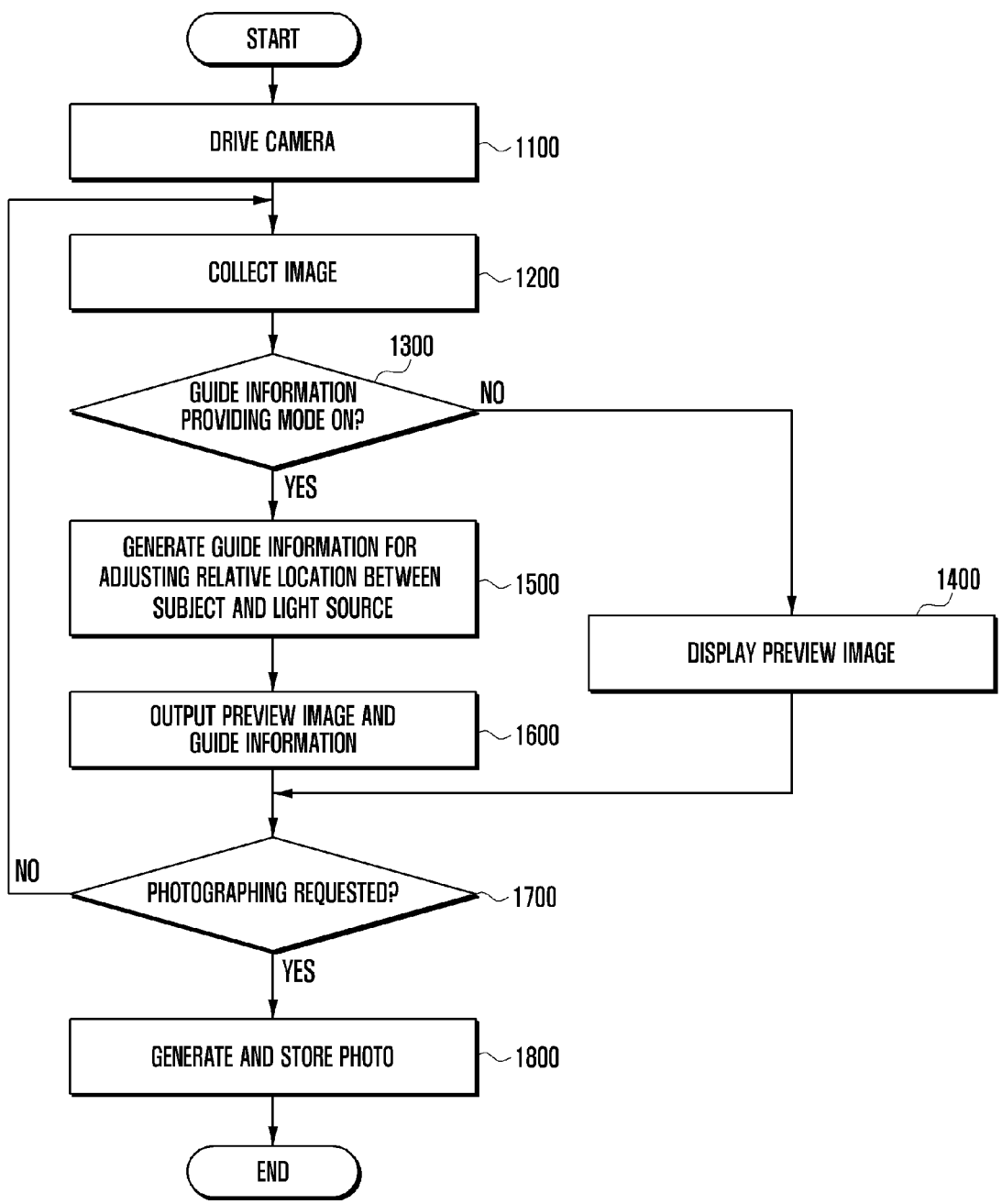
FIG. 4 is a flow chart showing an illustrative method of providing guide information to a camera according to an exemplary embodiment of the present invention.

FIG. 4 is a flow chart showing an illustrative method of providing guide information to or for a camera according to an exemplary embodiment of the present invention. In the method of FIG. 4, the case of photographing an image is described as an example; however, it is to be understood that the present invention is not limited to this particular example and may be applied to any of various exemplary embodiments requiring that guide information be provided to or for a camera, such as photographing a moving picture or engaging in a video telephony conversation.

Firstly, the control unit 130 (FIG. 1) drives or controls the camera unit 110 (FIG. 4, 1100).

The control unit 130 (FIG. 1) drives or controls the camera unit 110 according to a user's request or a request by an application, a service, or a program. For example, the control unit 130 may drive or control the camera unit 110 according to a request by one or more applications, such as an application for a text message, a social networking service (SNS), a phone book, a video telephony conversation, or photographing.

The control unit 130 transmits a control signal to the camera controller 114 for driving or controlling the camera unit 110. If the power of the camera unit 110 is switched off, the control unit 130 may control a power supply to supply an electric power to the camera unit 110.

If a control signal is received from the control unit 130, the camera controller 114 controls the operation of one or more components of the camera unit 110.

Subsequently, the control unit 130 collects an image (FIG. 4, 1200).

If the camera unit 110 (FIG. 1) is activated, the camera controller 114 collects lights reflected by the subject 200 (FIG. 3) through the lens 111 (FIG. 1). The collected lights are transmitted to the image sensor 112 and converted to electric signals, and the converted electric signals are converted to data signals by the image converter 113 so that the control unit 130 may process the data signals. The camera controller 114 receives the data signals converted by the image converter 113 and transmits the data signals to the control unit 130. This procedure is repeated while the camera unit 110 is being controlled or driven by the control unit 130.

The control unit 130 receives a data signal of the subject 200 (FIG. 3) from the camera controller 114 (FIG. 1). The control unit 130 processes the received data signal and generates image data so that the subject 200 (FIG. 3) may be visually output through the electronic device 100 (FIG. 1). The control unit 130 may store the generated image data in the storage unit 140 temporarily or permanently.

The control unit 130 collects an image of the subject 200 (FIG. 3) through the foregoing procedure. The control unit 130 (FIG. 1) may collect the image of the subject 200 (FIG. 3) while the camera unit 110 (FIG. 1) is being driven or controlled.

Here, the image collected by the control unit 130 may include a plurality of subjects 200 (FIG. 3). Furthermore, the image collected by the control unit 130 (FIG. 1) may have a pattern changed to a specific brightness according to the relative locations of the subject 200, the electronic device 100, and the light source as shown in FIG. 3.

Figure 5:
FIG. 5 is a drawing showing an exemplary image collected or gathered by a camera unit.

Referring to FIG. 5, the control unit 130 may collect an image of a person as the subject 200 (also see FIGS. 1 and 3). Here, the direction of the light source to the subject 200 (FIG. 3) as collected by the control unit 130 (FIG. 1) may be, for example, a right side light 300c (FIG. 3).

Together with an image, the control unit 130 (FIG. 1) may collect data regarding the image. For example, the control unit 130 may collect time information corresponding to a collected image, location information for the collected image, state information specifying one or more camera mode settings while collecting an image, and pixel information. The data regarding an image may be collected through at least one sensor installed in the electronic device 100.

Subsequently, the control unit 130 identifies whether the guide providing mode is active (1300, FIG. 4).

The control unit 130 (FIG. 1) may identify a setting state of the guide information providing mode. The guide information providing mode may be set by a user through the setting screen 10 shown in FIG. 2. Alternatively or additionally, the guide providing mode may be set to a default value as determined, for example, during the production of the electronic device 100 (FIG. 1). This default value may be, for example, an "on" state. The control unit 130 may be programmed to identify whether or not the guide information providing mode is active.

The control unit 130 may also identify detailed setting items for providing guide information. For example, if the guide information providing mode is active, the control unit 130 identifies a state of direction setting of the light source and a state of setting automatic control for photographing mode in order to provide the guide information.

If the detailed items for providing guide information are not set, the control unit 130 controls the display unit 150 to display the setting screen 10 (FIG. 2) for setting the detailed items. Furthermore, the control unit 130 (FIG. 1) performs a setting operation according to a user's input through the displayed setting screen 10 (FIG. 2). Alternatively, if the detailed items for providing guide information are not set, the control unit 130 may decide the detailed items according to default values set during the production of the electronic device 100 (FIG. 1).

Hereinafter, a method of providing guide information is described assuming that the direction of light source is preset to the right plain light 300b (FIG. 3) and the automatic control of photographing mode is set to be active.

If the guide information providing mode is set to be inactive, the control unit 130 displays a preview image according to a general method of processing a camera image (1400, FIG. 4).

The control unit 130 (FIG. 1) controls the display unit 150 to display a collected image as a preview image. The control unit 130 repeatedly collects the image, and controls the display unit 150 to display a preview image that changes in real time according to the movement of the subject 200 (FIG. 3) or the lens 111 (FIG. 1).

The control unit 130 controls the display unit 150 to display a user interface for controlling a camera together with the preview image. For example, the control unit 130 controls the display unit 150 to display a user interface for setting a photographing mode including one or more settings such as a shutter speed, an aperture opening, a white balance level, an ISO setting, or a filter application, together with the preview image. Alternatively or additionally, the control unit 130 controls the display unit 150 to display a user interface for requesting operations such as photographing, switching between still photo and moving picture, or zooming in and out. The user interface may be configured with at least one of an icon, an image, or text.

However, if the guide information providing mode is set to be active, the control unit 130 generates guide information for adjusting the location of the subject 200 (FIG. 3) relative to the location of the light source (FIG. 4, 1500). Hereinafter, a method of generating guide information according to an exemplary embodiment of the present invention is described in more detail.

Figure 6:
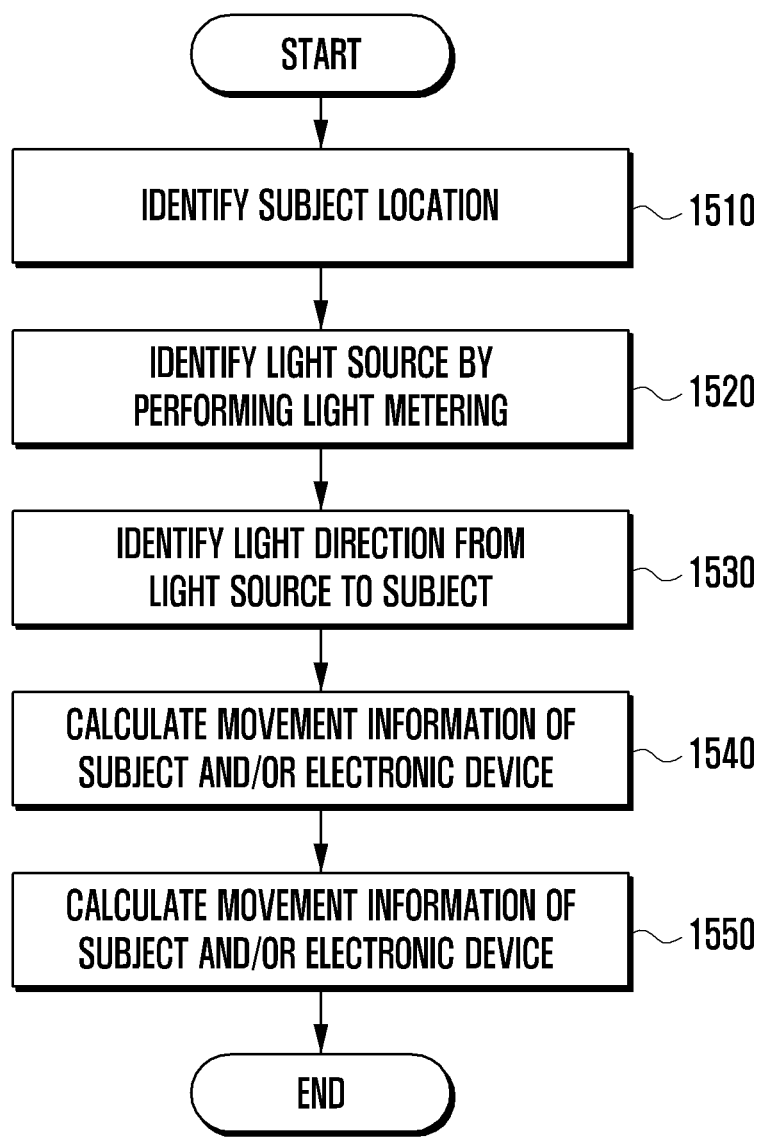
FIG. 6 is a flow chart showing an illustrative method of generating guide information according to an exemplary embodiment of the present invention.

Referring to FIG. 6, the control unit 130 identifies a location of the subject 200 (1510).

The control unit 130 (FIG. 1) extracts the subject 200 (FIG. 3) from the collected image and identifies the location of the subject 200 in the image.

The control unit 130 (FIG. 1) may extract the subject 200 (FIG. 3) by using any of various algorithms for extracting the subject 200. For example, the control unit 130 may use an algorithm extracting an outline of the subject 200 by using gradients of brightness, color, chroma, and the continuity of the gradient. Alternatively or additionally, the control unit 130 (FIG. 1) may use an algorithm extracting an area having a similar characteristic as the subject 200 (FIG. 3) by calculating similarities with respect to brightness, color, and chroma.

Figure 7:
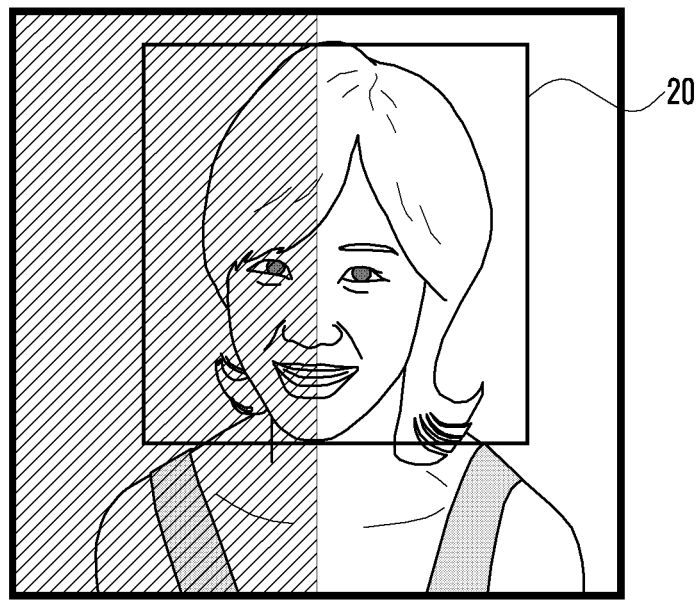
FIG. 7 is a drawing showing an example of extracting a face area of a subject from an image.

Referring to FIG. 7, in an exemplary embodiment of the present invention, the control unit 130 detects a face area 20 as a subject in the image by using a face detecting algorithm. The control unit 130 (FIG. 1) may detect a face area 20 (FIG. 7) by using any of various face detecting algorithms. For example, the control unit 130 (FIG. 1) may detect the face area by using a knowledge-based algorithm for detecting a face according to a principle based on studying knowledge, or a bottom-up feature-based algorithm for detecting a face by using a general characteristic that appears in a face image, or a template matching algorithm for detecting an area having a higher similarity to standard pattern information in an image by using the standard pattern information of a face image as calculated by a specific function, or an appearance-based algorithm for detecting a face area by using a statically analyzed result of the characteristics of face images. The algorithm for detecting a face may operate together with an automatic face recognition function of the camera.

The algorithm for detecting a face may be performed by using a program code stored in the storage unit 140. For example, the algorithm for detecting a face may be performed by using a program code including an open source library (for example, OpenCV) for processing computer vision management. The control unit 130 detects a face from the collected image by executing a program stored in the storage unit 140.

Several algorithms for extracting a subject 200 or a face area 20 as the subject 200 have been described previously as examples, but the algorithm for extracting a subject 200 (FIG. 3) by the control unit 130 (FIG. 1) is not so limited.

If a plurality of subjects 200 (FIG. 3) (including faces) are extracted, the control unit 130 (FIG. 1) may select a subject 200 to be used for identifying a location. Among the plurality of subjects 200 (FIG. 3), the control unit 130 (FIG. 1) may select a subject 200 (FIG. 3) located closest to the image as the subject 200 to be used for identifying a location. Alternatively, the control unit 130 (FIG. 1) may select a subject 200 (FIG. 3) according to a user's input. In detail, the control unit 130 (FIG. 1) controls the display unit 150 to display a preview image of the collected image. If the user's input is detected through the display unit 150 wherein this display unit is equipped with a touch screen, the control unit 130 selects a subject corresponding to the detected input as the subject 200 (FIG. 3) to be used for identifying a location. Alternatively, the control unit 130 (FIG. 1) may select a subject according to a focus setting state of the camera unit 110. For example, if the focus is set to a specific location in an image of the camera unit 110, the control unit 130 may select a subject located closest to the set location as the subject 200 (FIG. 3) to be used for identifying a location. Furthermore, the control unit 130 (FIG. 1) may select a subject using any of various methods according to a setting state of the electronic device 100 or a control operation performed by the user.

The control unit 130 identifies a location of the subject 200 (FIG. 3) extracted from the image. The control unit 130 (FIG. 1) selects coordinates from a 2-dimensional plane, and shows the location of the extracted subject 200 in the 2-dimensional coordinates. Further, the control unit 130 may show the location of the extracted subject 200 (FIG. 3) in a coordinate system that uses more than two dimensions.

The control unit 130 (FIG. 1) may perform preprocessing operations such as adjustment of brightness, noise reduction, and geometric correction of the collected image, in order to identify the location of the subject 200 correctly. The preprocessing operation may be performed through the camera unit 110.

In the image of FIG. 5, the control unit 130 identifies that the subject 200 is located in the center of the image according to the foregoing procedure. Here, the control unit 130 (FIG. 1) identifies that a face is located in the center of the image.

Additionally, the control unit 130 may identify a distance between the electronic device 100 and the subject 200 (FIGS. 1 and 3). The control unit 130 (FIG. 1) identifies the distance to the subject 200 (FIG. 3) by measuring a time of which infrared ray or ultrasonic waves emitted by the electronic device 100 (FIGS. 1 and 3) returns after reflected by the subject 200. To perform this measurement, the electronic device 100 may include an infrared or ultrasonic emitter. If the control unit 130 (FIG. 1) identifies a face as the subject through face recognition, the distance to the subject 200 (FIG. 3) can be identified based on the size of the subject and an area ratio of the subject to the entire image. Besides this approach, various technologies and algorithm calculations may be used for identifying the distance between the electronic device 100 and the subject 200 (FIG. 3).

Subsequently, the control unit 130 (FIG. 1) identifies a location of light source by performing light measurement (1520, FIG. 6).

The control unit 130 (FIG. 1) identifies the location of light source by performing light measurements of brightness in specific areas of the image (to determine an exposure level). Here, the control unit 130 divides a collected image into a plurality of areas and measures an exposure value for each area according to a matrix metering method.

Figure 8:
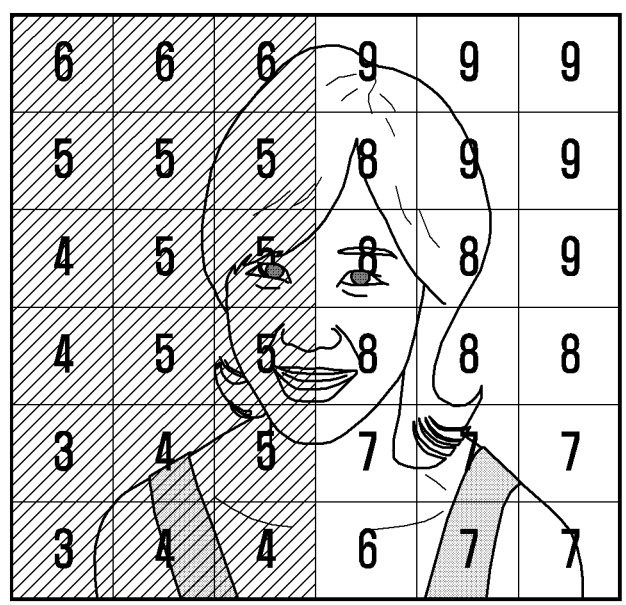
FIG. 8 is a drawing showing an example of performing a light measuring procedure.

In detail, referring to FIG. 8, the control unit 130 divides the collected image into a plurality of areas. The number, size, and shape of the areas may be decided using any of various approaches. The control unit 130 then measures an exposure value for each of the plurality of areas and labels the exposure value of each area. FIG. 8 shows an example of labeling the exposure value of each of the plurality of divided areas when the exposure value of the brightest area in the plurality of divided areas is set to 10 and the exposure value of the darkest area in the plurality of divided areas is set to 1. In this manner, each of the areas shown in FIG. 8 are labeled with a corresponding exposure value such as 3, 4, 5, 6, 7, 8, or 9.

The control unit 130 (FIG. 1) identifies the location of light source based on the measured exposure value for each of a plurality of areas of the image. Using these measured exposure values, the control unit 130 identifies the location of the light source in the image based on the brightness distribution of each of the areas of the image. For example, in FIG. 8, the exposure value increases in the right and upper areas and decreases in the left and lower areas. In FIG. 8, the measured exposure values do not exhibit extremely high values as would be the case if the light source were to be located at the rear side of the subject 200. Rather, in FIG. 8, it may be observed that the brightness decreases from the right side to the left side of the image. In this case, the control unit 130 identifies that the light source is located towards the right and upper side of the image.

The control unit 130 (FIG. 1) uses a set of coordinates of a 2-dimensional plane to display the location of the extracted subject 200 (FIG. 3) in this 2-dimensional plane. Furthermore, the control unit 130 (FIG. 1) may show the location of the extracted subject 200 (FIG. 3) in a coordinate system that uses more than 2 dimensions.

In an exemplary embodiment of the present invention, the control unit 130 (FIG. 1) may measure the exposure value of each of a plurality of divided face areas 20 (FIGS. 7 and 9) by using a technique similar to a matrix or spot metering method. Namely, if the face area 20 is extracted in the procedure of extracting a subject 200 (FIG. 3), the control unit 130 (FIG. 1) measures an exposure value of the extracted face area 20 (FIGS. 7 and 9).

Figure 9:
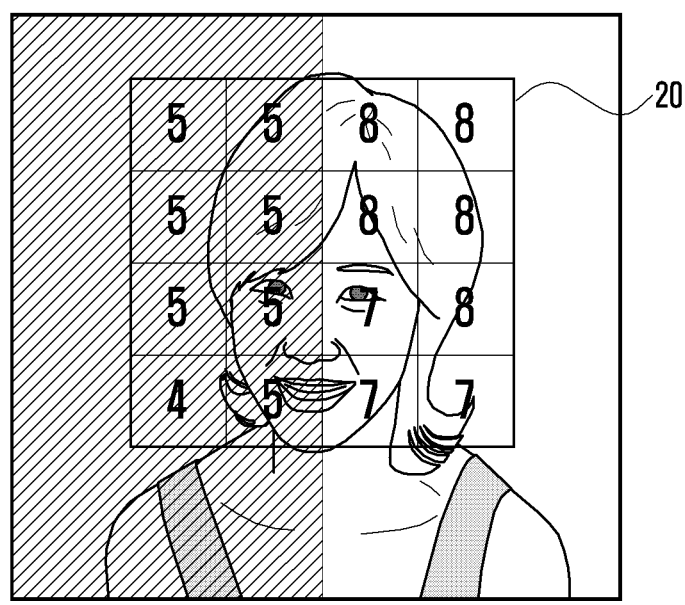
FIG. 9 is a drawing showing an example of performing a light measuring procedure for a face area of a subject.

In detail, referring to FIG. 9, the extracted face area 20 is divided into a plurality of areas. The number, size, and shape of the divided areas may be decided using any of various approaches. The control unit 130 (FIG. 1) then measures an exposure value for each of the plurality of divided areas and labels the exposure value of each area. FIG. 9 shows an example of labeling the exposure value for each of a plurality of divided areas when the extracted face area 20 (FIG. 9) is divided into the plurality of areas as shown in FIG. 7, when the exposure value of the brightest area in the plurality of divided areas is set to 10, and the exposure value of the darkest area in the plurality of divided areas is set to 1.

The control unit 130 (FIG. 1) identifies the location of light source in the face area 20 (FIG. 9) based on the measured exposure value. According to the result of measuring the exposure value, the control unit 130 (FIG. 1) identifies the location of the light source illuminating the face area 20 (FIG. 9) based on the distribution of divided areas having a higher brightness. For example, in FIG. 8, the exposure value increases in the right and upper areas and decreases in the left and lower areas. In FIG. 9, the measured exposure value does not show an extremely high value as would be the case if the light source were to be located at the rear side of the subject 200, but rather decreases from the right side to the left side of the image. In this case, the control unit 130 (FIG. 1) identifies that the light source is located at the right and upper side of the face area 20 (FIG. 9).

In an exemplary embodiment of the present invention, in order to correctly identify the location of a light source that is illuminating a subject, the control unit 130 determines the location or orientation of the light source by using methods such as averaging, statistical analysis, and scoring, based on the location or orientation of the light source in the image and the location of light source in the face area 20.

Further, in an exemplary embodiment of the present invention, the control unit 130 (FIG. 1) may identify the location or orientation of the light source relative to the subject 200 (FIG. 3) based on the direction of the sunlight. In detail, the control unit 130 (FIG. 1) may receive location information (longitude and latitude) of the electronic device 100 from a GPS satellite through the satellite communication module 163. The control unit 130 may receive the receive direction or orientation information of the sun projecting to the electronic device 100 at the time of image collection through the storage unit 140 or the communication unit 160. The direction or orientation information of the sun projecting to the electronic device 100 at the time of image collection may be stored in the storage unit 140. Furthermore, the control unit 130 may identify or determine a direction in which the camera unit 110 is aiming, by using information collected by the sensor 170. The control unit 130 identifies the location information of the sun based on the direction or orientation of sunlight and the aiming direction of the camera unit 110, and identifies the direction or orientation as the location of the light source.

For example, if the location information of the electronic device 100 identified through the satellite communication module 163 is 37° North latitude and the time of collecting an image is 2:00 pm, the control unit 130 identifies that the sun is located in a southerly direction by using data stored in the storage unit 140 or data received through the communication unit 160. Furthermore, if the camera unit 110 is determined to be aimed to the east based on information collected by the sensor 170, the control unit 130 identifies that the light source is located to the right.

In the foregoing description, several methods for identifying a location of light source, including a method of identifying a location of light source illuminating the face area 20, have been described; however, various methods of identifying the location of the light source may be used and these methods are intended to fall within the scope of the present invention.

In the image of FIG. 5, the control unit 130 identifies that the light source is located at the right and upper sides of the image.

Subsequently, the control unit 130 (FIG. 1) identifies a direction of the light source to the subject 200 (1530, FIG. 6).

The control unit 130 (FIG. 1) identifies the direction of the light source to the subject 200 (FIG. 3) based on the identified locations of the subject 200 and the light source. The control unit 130 (FIG. 1) identifies in which direction or at what orientation the light source is situated based on the location of the subject 200 (FIG. 3), for example, up, down, right, or left to the subject, and at the front or rear of the subject 200.

The control unit 130 (FIG. 1) may use the exposure value that was measured in the process of identifying or determining the actual direction of the light source to determine a correct, desired, or optimized direction for the light source. For example, in order to distinguish plain light (300*b* or 300*b*') (FIG. 3) illumination from cross light (300*d* or 300*d*') illumination, the control unit 130 (FIG. 1) may identify whether an image is generally dark, or whether a line or region of light is formed in a specific area by using the measured exposure values. According to the measured exposure values, if the image is generally dark or if a line or region of light is formed in a specific area, the control unit 130 identifies the direction of light source as being cross light (300*d* or 300*d*') (FIG. 3) illumination.

In the image of FIG. 5, the control unit 130 identifies that the direction of light source is a right side light 300*c* through the above procedure.

Subsequently, the control unit 130 (FIG. 1) calculates movement information of at least one of the subject 200 and the electronic device 100 (1540, FIG. 6).

The control unit 130 (FIG. 1) calculates the movement information based on a predetermined direction for the light source and the identified direction of the light source. The predetermined direction of the light source may be set or specified by a user through the setting screen 20 (FIG. 2) or may be stored in the storage unit 140 (FIG. 1) as a default value set during the production of the electronic device 100. The control unit 130 may calculate movement information of the subject 200 (FIG. 3) or of the electronic device 100 (FIG. 1), of which the identified actual direction of the light source becomes identical to the predetermined, desired, or optimized direction of the light source. Here, the movement direction may include a subject for the movement, a movement direction, a movement distance, a rotation direction, or a rotation angle. If the camera unit 110 is externally connected to the electronic device 100 by a wire or wirelessly, or if the lens 111 is movable or rotatable, the movement information may be used as data for the camera unit 110 or for the lens 111.

In an exemplary embodiment of the present invention, the control unit 130 may identify the direction of light source to the subject 200 (FIG. 3) as a right side light 300*c* as shown in the image of FIG. 5. Further, in an exemplary embodiment of the present invention, the control unit 130 (FIG. 1) may set the direction of light source to the plain light (300*b* or 300*b*') as shown in FIG. 2. Referring to FIG. 3, the plain light (300*b* or 300*b*') close to the right side light 300*c* corresponds to a right plain light 300*b*. In order to change the actual or current direction of the light source from the right side light 300*c* to the predetermined, desired, or optimized right plain light 300*b*, at least one of the subject 200 or the electronic device 100 (or both) must move.

Figure 10:
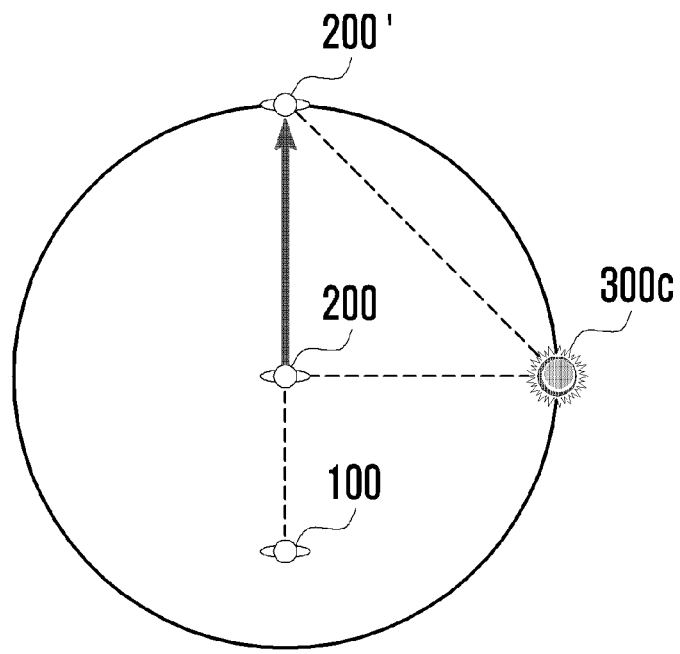
FIG. 10 is a drawing showing an example of moving a subject in response to generated guide information according to an exemplary embodiment of the present invention.
Figure 11:
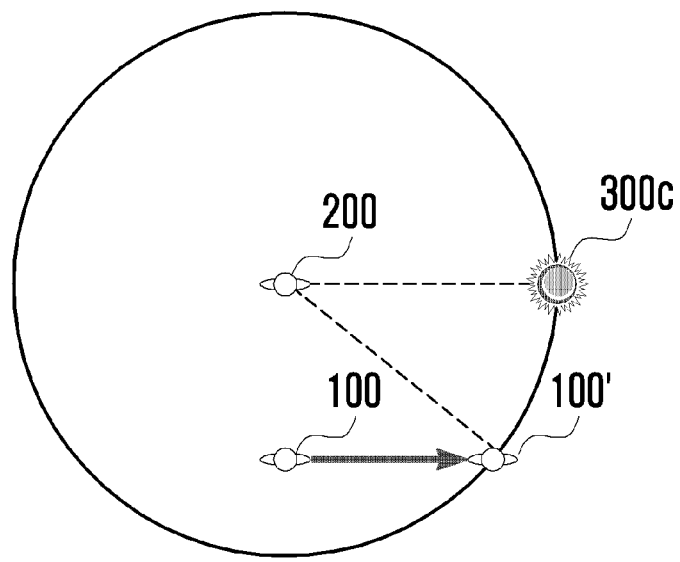
FIG. 11 is a drawing showing an example of moving an electronic device in response to generated guide information according to an exemplary embodiment of the present invention.

To change the actual or current direction of the light source from the right side light 300*c* to a predetermined, optimized, or desired right plain light 300*b*, the subject 200 must move backwards as shown in FIG. 10, or the electronic device 100 must move rightwards as shown in FIG. 11.

Figure 12:
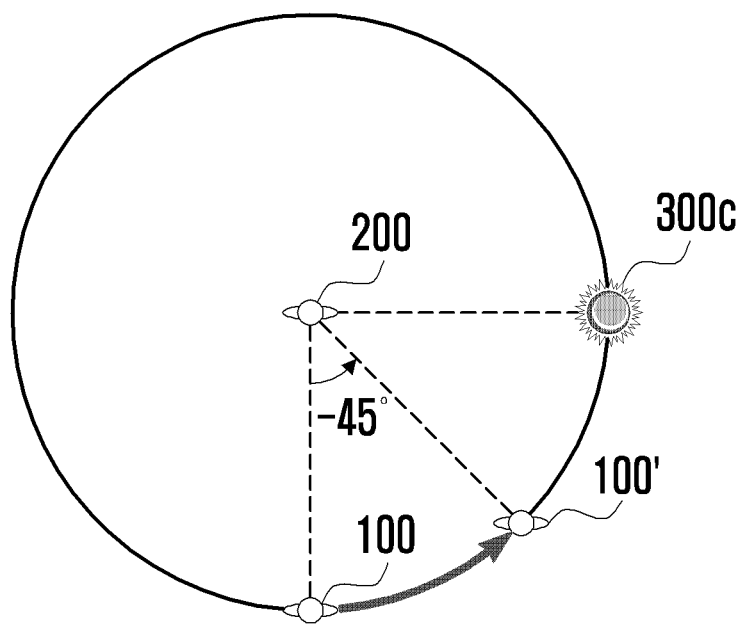
FIG. 12 is a drawing showing an example of moving an electronic device along a circular path in response to generated guide information according to an exemplary embodiment of the present invention.

Alternatively, to change the actual or current direction of the light source from the right side light 300*c* to the predetermined, optimized, or desired right plain light 300*b*, as shown in FIG. 12, the electronic device 100 must move −45° along the circumference having a radius corresponding to the distance between the electronic device 100 and the subject 200 based on using the subject 200 as a center point. If the distance between the electronic device 100 and the subject 200 is 1 meter, the distance that the electronic device 100 needs to move along the circumference is about 0.8 meters according to the following Formula 1:

$$l = r \times \theta \qquad \text{Formula 1}$$

where, l is a movement distance of the electronic device 100, r is a distance between the electronic device 100 and the subject 200, and Θ is an angle difference in radians between the current or actual direction of the light source and a predetermined, optimized, or desired direction of the light source.

The control unit 130 (FIG. 1) may calculate the movement information based on the difference between the identified actual current direction of the light source and the predetermined, optimized, or desired direction of the light source. Namely, in the image of FIG. 5, the control unit 130 may identify movement information of which the subject 200 (FIG. 3) must move backwards or the electronic device 100 must move rightwards. Alternatively, the control unit 130 (FIG. 1) may identify movement information for which the electronic device 100 must move by −45° along the circumference having the subject 200 (FIG. 3) as a center point, or move 0.8 m in the counterclockwise direction.

According to another exemplary embodiment of the present invention, the movement information according to the identified actual current direction of the light source and the predetermined, optimized, or desired direction of the light source may be calculated in advance and stored in the storage unit 140. Logically, the movement information according to the identified direction of the light source and the predetermined direction of the light source is generally identical, and thereby the calculation time may be reduced by storing the movement information according to the identified direction of the light source and the predetermined direction of the light source in advance. In this case, the control unit 130 (FIG. 1) may search movement information corresponding to the identified direction of the light source and the predetermined direction of the light source from the storage unit 140 and obtain the movement information according to the result of the search.

The control unit 130 may identify image information of the detected image, such as color information and contrast information, in addition to or in lieu of identifying the exposure value. The control unit 130 may select a photographing mode for obtaining an optimized photo based on the identified image information. If the automatic control of photographing mode is set to "on" through the setting screen 20 (FIG. 2), the control unit 130 (FIG. 1) may select the photographing mode based on the identified image information so that the identified image information corresponds to a predetermined image information. In detail, if the identified image information is not identical to the predetermined image information set by the manufacturer of the electronic device 100 or by a user, the control unit 130 selects the photographing mode so that the identified image information corresponds to the predetermined image information. The photographing mode may include any of a shutter speed, an aperture opening setting, a white balance setting, an ISO setting, and a filter application setting.

Lastly, the control unit 130 generates guide information based on the movement information (1550, FIG. 6).

The guide information provides a user with movement information so that the user may adjust the direction or orientation of the light source to the subject 200 (FIG. 3) according to the predetermined, optimized, or desired direction of the light source. The guide information includes at least one of an icon, an image, or text corresponding to the movement information. The guide information comprises movement information including any of the icon, the image, or the text, such that the movement information is indicative of a subject for the movement such as a subject 200 (FIG. 3) or an electronic device 100, a movement direction, a movement distance, a rotation direction, and a rotation distance. The guide information may further include information related to any of voice conversion data, vibration period, intensity of vibration, brightness of light, color, blinking period, audio data for outputting a voice, vibration, or light.

If the control unit 130 (FIG. 1) completes selection of a photographing mode according to the setting of automatic control for photographing mode and the predetermined image information, the control unit 130 generates guide information including the selected photographing mode.

The control unit 130 may store the generated guide information in the storage unit 140 temporarily or permanently. The control unit 130 may store information for a collected image in the storage unit 140 by combining the collected image with the guide information. The control unit 130 may store information including any of a time at which a photograph was taken, a location at which the photograph was taken, information regarding one or more setting states or operational modes for the camera or pixel information. The pixel information may, but need not, be combined with the guide information.

If the generation of guide information has been completed, the control unit 130 outputs a preview image and guide information (1600, FIG. 4).

The control unit 130 (FIG. 1) controls the display unit 150 to display a preview image of the collected image. The control unit 130 may control the display unit 150 to display a user interface for setting a photographing mode including a shutter speed, an aperture opening, a white balance setting, an ISO setting, and a filter application setting, together with the preview image. Furthermore, the control unit 130 may control the display unit 150 to display a user interface for requesting that a photograph be taken, switching between still photo and moving picture, and zooming in and out, together with the preview image. The user interface includes at least one of an icon, an image, or text.

The control unit 130 may control the display unit 150 to display the generated guide information together with the preview image. The control unit 130 may control the display unit 150 to display the guide information in the preview image or in a separate area from the preview image.

Figure 13:
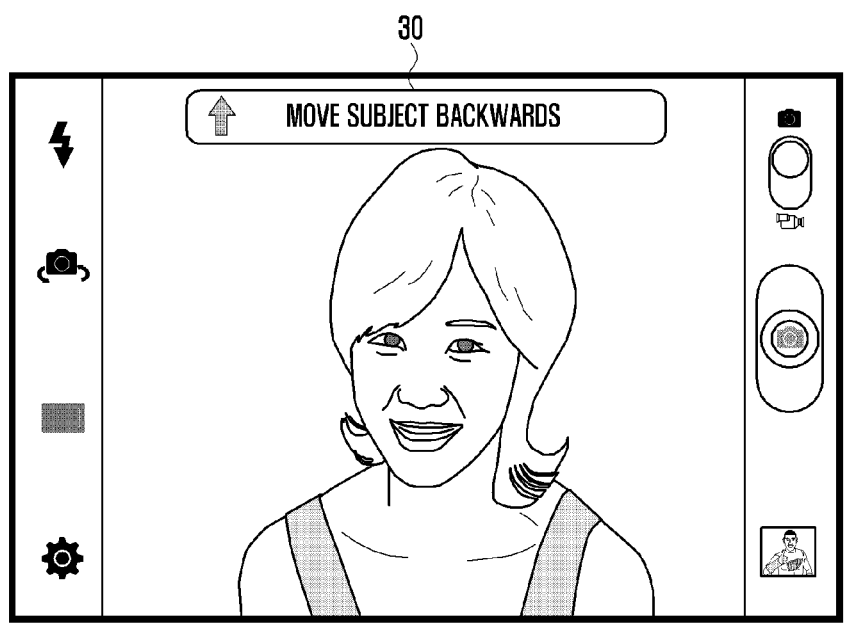
FIG. 13 is a drawing showing an example of displaying guide information.
Figure 14:
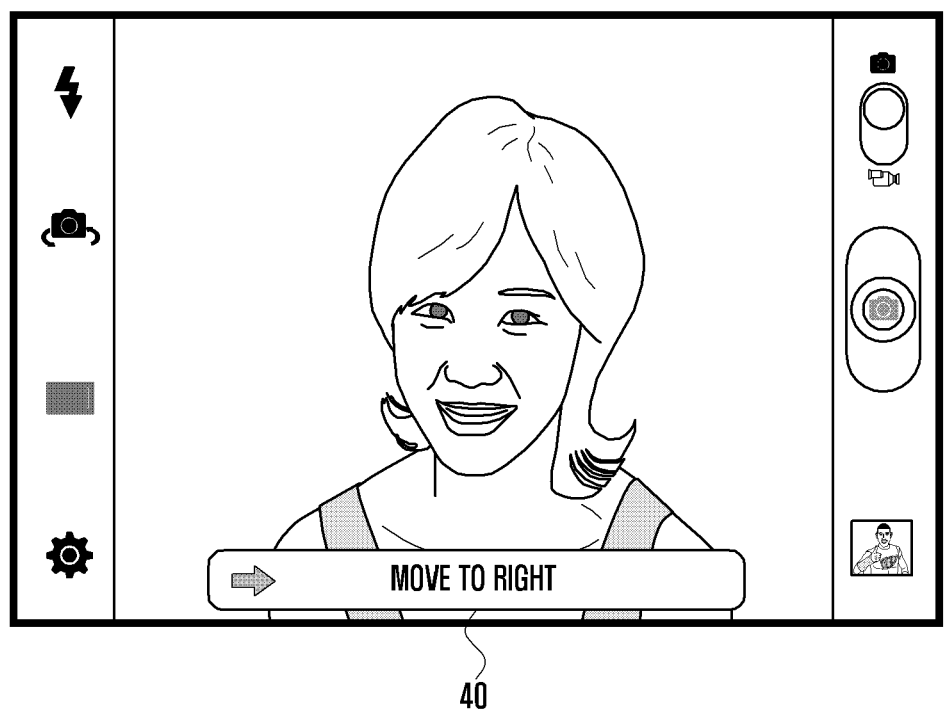
FIG. 14 is a drawing showing another example of displaying guide information.

In the exemplary embodiment of FIG. 5, the control unit 130 may control the display of guide information 30 by generating an instruction to move the subject backwards in the preview image according to the identified movement information as shown in FIG. 13. Alternatively, the control unit 130 may control the display of guide information 40 by generating an instruction to move the electronic device 100 rightwards according to the identified movement information as shown in FIG. 14. Furthermore, the control unit 130 may control the display of the identified movement information in the form of any of an image or icon, angle information, moving path, or movement distance in numerals.

In an exemplary embodiment of the present invention, the control unit 130 may output at least one of a voice, a vibration, or light. For example, the control unit 130 may output a text included in the guide information as a voice. Alternatively, the control unit 130 may output a vibration along the right, left, up, or down directions of the electronic device 100 according to movement information included in the guide information. The control unit 130 may further output a vibration or a light until the direction of the light source to the subject becomes to identical to the predetermined or optimized or desired direction by moving the subject 200 or the electronic device 100 according to the guide information.

The control unit 130 repeatedly collects images through the camera unit 110, identifies movement information for adjusting the direction of the light source, and displays guide information by updating the guide information in real time until the direction of the light source reaches the predetermined, optimized, or desired direction of the light source. Furthermore, the control unit 130 may repeatedly output a voice, a vibration, or a light until the actual current direction of the light source reaches the predetermined, optimized, or desired direction of the light source.

In the case that the photographing mode is selected according to the setting of automatic control for photographing mode, the control unit 130 may control the display of guide information including displaying the result of selecting the photographing mode. Alternatively, the control unit 130 may automatically set the photographing mode to a preselected photographing mode.

Subsequently, the control unit 130 identifies whether a request for photographing an image is generated (1700, FIG. 4).

The control unit 130 (FIG. 1) may identify whether a request for photographing is generated. The request for photographing may be generated through the input unit 120 or the display unit 150 including a touch screen. Alternatively, the request for photographing may be generated as a signal according to instructions issued by an application, a program, a service, or a signal transmitted from the outside through a communication unit installed in the electronic device 100.

If the request for photographing is generated, the control unit 130 generates and stores a photo (1800, FIG. 4).

The control unit 130 (FIG. 1) generates the photo by processing the image collected at the time of photographing. The generated photo may, but need not, have a compressed format such as a jpg, jpeg, tif, or bmp. The control unit 130 may store the generated image in the storage unit 150 temporarily or permanently. The control unit 130 may store data including any of a file name, a file size, photo information, or photographer information by combining this data with the photo.

The control unit 130 may control the display unit 150 to display a stored photo. The control unit 130 may control the display unit 150 to display the stored photo for a predetermined time or until a user's input is detected.

The control unit 130 may play a designated sound or audio file while photographing, and controls the display unit 150 to display an icon, image, or text indicating that a photo is being generated.

If photographing is not requested, the control unit 130 returns to the step of collecting an image and repeats the guide information providing operation according to an exemplary embodiment of the present invention.

For the image collected in real time through the camera unit 110, the control unit 130 repeatedly generates guide information and displays the guide information for the user.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Although exemplary embodiments of the present invention have been described in detail herein, it should be understood that many variations and modifications of the basic inventive concepts described herein will still fall within the scope of the present invention as defined in the appended claims.

What is claimed is:

1. A method of providing guide information for a camera, the method comprising:
    collecting an image through the camera, wherein the image includes a subject illuminated by a light source;
    determining, by a controller, an optimized angle between a direction of a light source and the subject and a direction of the camera and the subject;
    measuring, by the controller, an actual angle between the direction of the light source to the subject and the direction of the camera to the subject;
    generating, by the controller, guide information that specifies an adjustment of the direction of the light source to the subject for achieving the optimized angle based on the difference between the optimized angle and the actual angle; and
    displaying the generated guide information on a display.

2. The method of claim 1, wherein the generating guide information comprises:
    calculating movement information for at least one of the subject or the camera based on the difference between the optimized angle and the actual angle, wherein the movement information has a distance.

3. The method of claim 2, wherein the measuring the actual angle comprises:
    identifying a location of the subject in the image;
    identifying a location of the light source by performing light brightness measuring within the image; and
    identifying the direction of the light source to the subject based on the location of the subject and the location of the light source.

4. The method of claim 3, wherein the identifying a location of the subject comprises:
    accepting a user's input for selecting the subject among a plurality of subjects in the image; and
    identifying a location in the image corresponding to the selected subject.

5. The method of claim 3, wherein the identifying the location of the subject comprises extracting a face area of the subject by using a face detection algorithm.

6. The method of claim 5, wherein the identifying a location of the light source comprises:

dividing the image into a plurality of areas;
measuring an exposure value for each of the plurality of areas;
dividing a face area of the image into a plurality of sub-areas of the face area;
measuring an exposure value for each of the plurality of sub-areas of the face area; and
identifying a location of the light source based on the exposure value for each of the plurality of areas of the image and the exposure value for each of the plurality of sub-areas of the face area.

7. The method of claim 3, wherein the identifying of the location of the light source comprises:
dividing the image into a plurality of areas;
measuring an exposure value for each of the plurality of areas; and
identifying a location of the light source based on the measured exposure value for each of the plurality of areas.

8. The method of claim 2, wherein displaying of guide information comprises displaying both a preview image of the image and the guide information.

9. The method of claim 1, wherein the generating of guide information comprises:
identifying an angle difference between the actual angle and the optimized angle;
determining a distance between the camera and the subject;
calculating a curved movement distance based on the angle difference and the distance between the camera and the subject according to the following Formula 1; and
generating the guide information by using at least one of: (a) the identified angle difference, or (b) the curved movement distance;

$$l = r \times \theta \qquad \text{Formula 1}$$

where, l is a curved movement distance, r is a distance between a camera and a subject, and Θ is an angle difference in radians.

10. The method of claim 1, wherein displaying of guide information comprises outputting at least one of a voice, a vibration, or light corresponding to the guide information.

11. The method of claim 1, wherein the direction of the light source to the subject is any one of front light, plain light, side light, cross light, or back light.

12. An electronic device, comprising:
a camera configured to collect an image of a subject illuminated by a light source;
a controller connected to the camera and configured to determine an optimized angle between a direction of a light source and the subject and a direction of the camera and the subject, measure an actual angle between the direction of the light source to the subject and the direction of the camera to the subject and generate guide information that specifies an adjustment of the direction of the light source to the subject for achieving the optimized angle based on the difference between the optimized angle and the actual angle; and
a display connected to the controller and configured to display the guide information generated by the controller.

13. The electronic device of claim 12, wherein the controller calculates movement information for at least one of the subject or the electronic device based on the difference between the optimized angle and the actual angle, wherein the movement information has a distance, and generates the guide information based on the movement information.

14. The electronic device of claim 13, wherein the controller identifies a location of the subject in the image, identifies a location of the light source by performing light brightness measuring within the image, and identifies the direction of the light source to the subject based on the location of the subject and the location of the light source.

15. The electronic device of claim 14, further comprising an input device that accepts a user input for selecting the subject among a plurality of subjects in the image, wherein the controller identifies a location in the image corresponding to the selected subject.

16. The electronic device of claim 14, wherein the controller extracts a face area of the subject by using a face detection algorithm.

17. The electronic device of claim 16, wherein the controller divides the image into a plurality of areas, measures an exposure value for each of the plurality of areas, divides a face area of the image into a plurality of sub-areas of the face area, measures an exposure value for each of the plurality of sub-areas of the face area, and identifies a location of the light source based on the exposure value for each of the plurality of areas of the image and the exposure value for each of the plurality of sub-areas of the face area.

18. The electronic device of claim 14, wherein the controller divides the image into a plurality of areas, measures an exposure value for each of the plurality of areas, and identifies a location of the light source based on the measured exposure value for each of the plurality of areas.

19. The electronic device of claim 13, wherein the display displays both a preview image of the image and the guide information under the control of the controller.

20. The electronic device of claim 12, wherein the direction of the light source is any one of front light, plain light, side light, cross light, or back light.

21. The electronic device of claim 12, wherein the controller receives a user input indicating optimized angle.

22. The electronic device of claim 12, wherein the electronic device further comprises:
a satellite communication module configured to receive location information of the electronic device;
wherein the light source is the sun; and
wherein the controller is configured to determine the actual angle by determining a direction of the sun to the subject based on the location information, and the time.

* * * * *

UNITED STATES PATENT AND TRADEMARK OFFICE
CERTIFICATE OF CORRECTION

PATENT NO. : 9,491,370 B2  
APPLICATION NO. : 14/242093  
DATED : November 8, 2016  
INVENTOR(S) : Jaeyung Yeo et al.

Page 1 of 1

It is certified that error appears in the above-identified patent and that said Letters Patent is hereby corrected as shown below:

On the Title Page

Item (73), Line 2 should read as follows:  
--...Yeongtong-gu, Suwon-si, Gyeonggi-do...--

Signed and Sealed this  
Fourteenth Day of February, 2017

Michelle K. Lee  
*Director of the United States Patent and Trademark Office*